United States Patent
Liu et al.

(10) Patent No.: US 10,617,959 B2
(45) Date of Patent: Apr. 14, 2020

(54) METHOD AND SYSTEM FOR TRAINING A CHATBOT

(71) Applicant: MOVEWORKS, INC., Fremont, CA (US)

(72) Inventors: Chang Liu, Mountain View, CA (US); Jiang Chen, Fremont, CA (US)

(73) Assignee: Moveworks, Inc., Mountain View, CA (US)

( * ) Notice: Subject to any disclaimer, the term of this patent is extended or adjusted under 35 U.S.C. 154(b) by 193 days.

(21) Appl. No.: 15/873,911

(22) Filed: Jan. 18, 2018

(65) Prior Publication Data

US 2019/0217206 A1 Jul. 18, 2019

(51) Int. Cl.
| | |
|---|---|
| *A63F 13/98* | (2014.01) |
| *A63F 13/46* | (2014.01) |
| *A63F 13/798* | (2014.01) |
| *G06N 5/02* | (2006.01) |
| *H04L 12/58* | (2006.01) |
| *G06N 20/00* | (2019.01) |
| *G06N 3/00* | (2006.01) |

(52) U.S. Cl.
CPC ............ *A63F 13/798* (2014.09); *A63F 13/46* (2014.09); *G06N 3/006* (2013.01); *G06N 5/025* (2013.01); *G06N 20/00* (2019.01); *H04L 51/02* (2013.01)

(58) Field of Classification Search
USPC .......................................................... 463/42
See application file for complete search history.

(56) References Cited

U.S. PATENT DOCUMENTS

| | | |
|---|---|---|
| 2010/0324908 A1 | 12/2010 | Rosser et al. |
| 2014/0122618 A1 | 5/2014 | Duan |
| 2014/0122619 A1 | 5/2014 | Duan |
| 2016/0300570 A1 | 10/2016 | Gustafson |
| 2018/0302682 A1* | 10/2018 | Saxena ............ H04N 21/47815 |
| 2019/0205839 A1* | 7/2019 | Dotan-Cohen ....... A61B 5/1118 |
| 2019/0236204 A1* | 8/2019 | Canim .................. G10L 15/265 |

FOREIGN PATENT DOCUMENTS

WO 2916044618 3/2016

* cited by examiner

*Primary Examiner* — Pierre E Elisca
(74) *Attorney, Agent, or Firm* — Kanika Radhakrishnan; Evergreen Valley Law Group

(57) ABSTRACT

A computer-implemented method for training a chatbot is provided. The method includes receiving a training input through a platform associated with the chatbot. The training input indicates user intent for interacting with the chatbot. The method includes calculating a confidence score associated with a prediction of the user intent identified by the chatbot. The method further includes providing a training score to the user providing the training input based on the confidence score.

19 Claims, 8 Drawing Sheets

LEADERBOARD - CUMULATIVE TRAINING SCORE

| ALL-TIME | | DAILY | |
|---|---|---|---|
| 1. JOHN SMITH — 1042 | | 1. EMMA LIU — 17.3 | |
| 2. JACKY LEE — 983 | | 2. JACKY LEE — 16.9 | |
| 3. ROBERT ROBINSON — 971 | | 3. JOHN SMITH — 5.4 | |
| 4. EMMA LIU — 563 | | 4. LARRY BROWN — 2.3 | |
| 5. LARRY BROWN — 497 | | 5. ROBERT ROBINSON — 0.2 | |

FIG. 6A
600

LEADERBOARD - AVERAGE TRAINING SCORE

| ALL-TIME | | DAILY | |
|---|---|---|---|
| 1. JOHN SMITH — 0.92 | | 1. EMMA LIU — 0.9 | |
| 2. JACKY LEE — 0.73 | | 2. JACKY LEE — 0.89 | |
| 3. ROBERT ROBINSON — 0.71 | | 3. JOHN SMITH — 0.64 | |
| 4. EMMA LIU — 0.56 | | 4. LARRY BROWN — 0.5 | |
| 5. LARRY BROWN — 0.43 | | 5. ROBERT ROBINSON — 0.47 | |

FIG. 6B
602

METHOD AND SYSTEM FOR TRAINING A CHATBOT

TECHNICAL FIELD

Embodiments of the disclosure relate generally to conversational interfaces, such as chatbots and, more particularly to, methods and systems for training chatbots.

BACKGROUND

There is a great deal of enthusiasm surrounding chatbots in the Internet technology world today. The chatbot is a computer program or a series of computer-executable instructions designed to simulate an intelligent conversational interface that enables interactive chat sessions with human users via auditory or textual methods. Entities offering services, products, etc., over the Internet, implement chatbots or virtual agents for intelligent conversations through online platforms for various practical purposes such as customer service and information delivery. Chatbots can be available as standalone applications or can be integrated with various websites as a platform/tool for providing assistance to users.

The chatbot provides a conversational experience for interaction with users. For instance, the users can type a question and the chatbot will attempt to interpret it, and then provide an answer. The answers that the user receives from the chatbot are preprogrammed with the chatbot. The chatbot needs to be trained on different kinds of inputs received from the users in order to modify the chatbot's responses, which will enhance the customer experience while interacting with the chatbot.

Training an intelligent chatbot requires a large amount of high-quality training data such that the underlying algorithm can model the sophistication in human conversations. However, obtaining such high-quality data can be very challenging. Some public chat log data sets are available on the Internet but they are generally available in a social setting, and thus the data sets are insufficient for training the model to understand deeper conversations in specific contexts. Hence, training data need to be fed to the chatbot by an end user or a dedicated data collector. The above-mentioned process is usually inefficient as the user is disconnected with the developer who works on improving the model. As a consequence, it cannot always be guaranteed that the quality of the training data provided by the end user is of high quality and good enough to train the chatbot on sophisticated human conversations.

In light of the above discussion, there appears a need for a technique that promotes users to come up with high-quality training inputs that can train the chatbot to understand conversations in specific contexts.

SUMMARY

Various embodiments of the present disclosure provide a method and a system for training a chatbot.

An embodiment provides a computer-implemented method for training a chatbot. The method includes receiving a training input through a platform associated with the chatbot. The training input indicates user intent for interacting with the chatbot. The method includes calculating confidence score associated with a prediction of the user intent identified by the chatbot. The method further includes delivering a training score to a user providing the training input based on the confidence score.

Another embodiment provides a system for training a chatbot. The system includes a memory configured to store instructions. The system includes a processor configured to execute the stored instructions to cause the system to at least perform receiving a training input through a platform associated with the chatbot, wherein the training input is indicative of the user intent for interacting with the chatbot. The system is further caused to calculate a confidence score associated with a prediction of the user intent identified by the chatbot. The system is further caused to deliver a training score to a user providing the training input based on the confidence score.

BRIEF DESCRIPTION OF THE FIGURES

For a more complete understanding of example embodiments of the present technology, reference is now made to the following descriptions taken in connection with the accompanying drawings in which:

FIG. 6A is an example representation of a leaderboard for displaying scores of users involved in training the chatbot, in accordance with an example embodiment;

FIG. 6B is another representation of a leaderboard for displaying average scores of the users involved in training the chatbot, in accordance with an example embodiment;

Figure 1:
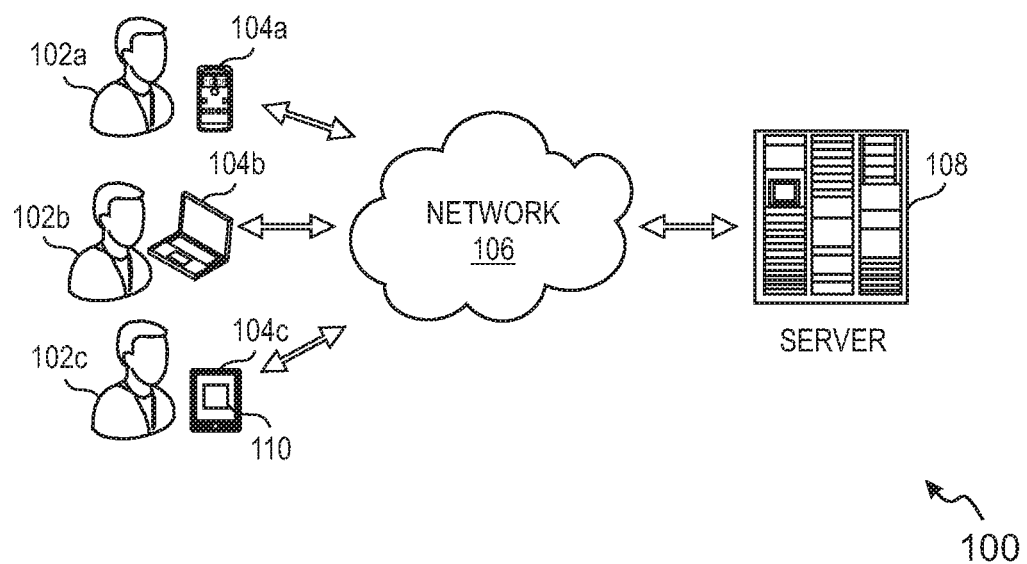
FIG. 1 is an example schematic representation of an environment showing a plurality of users for training a chatbot using respective user devices for providing training inputs, in accordance with at least some example embodiments.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for training a chatbot.

The chatbot and its components may be hosted by a server and are made available to users across geographies. An example of the user includes but not limited to a customer playing games over the Internet using user devices (e.g., PlayStations, computers, other gaming systems, etc.) and commencing a chat session with the chatbot for training the chatbot. Alternatively or additionally, chatbot and its components can be entirely managed on a standalone user system such as a PlayStation. A user may communicate with the chatbot via a chatbot dialog interface to train a chatbot model associated with the chatbot. The user via his/her user device establishes a chat session with the chatbot using a network such as the Internet. In case of a PlayStation in which the chatbot is hosted, the user can locally interact with the chatbot using the chat dialogue interface of the PlayStation.

The server system includes a memory/storage and a processor. The memory includes an intent model. The intent model includes a plurality of existing training inputs, a plurality of user intents and responses. The training inputs, the user intents, and the responses are mapped based on pre-defined criteria. The chatbot receives training inputs from the user through the chatbot dialog interface. The training inputs may be in the form of texts and/or audio. The processor calculates a confidence score for the chatbot based on the training inputs provided by the user. The confidence score is associated with a prediction of a user intent for the training input and is represented in a floating number ranged between 0 and 1. A confidence score of 0 indicates that the user has trained the chatbot with new information (training input) which is already not available in the intent model. A confidence score of 1 indicates the user has failed to train the chatbot with new information. A confidence score between 0 and 1 indicates that the user has trained the chatbot with information which the chatbot may not know but could guess the intent based on the previous conversation. The processor calculates a training score for the user based on the confidence score. The training score can be calculated based on a formula, TS=1−CS, where TS stands for training score and CS stands for confidence score. The training scores are further displayed on a leaderboard provided at the user device. The leaderboard displays the scores and ranks of all the users involved in the training of the chatbot.

FIG. 1 is an example schematic representation of an environment 100, related to at least some example embodiments. The environment 100 includes a plurality of users for training the chatbot, through a dedicated platform/interface/application presented at respective user devices for providing training inputs to train the chatbot. For instance, three users 102a, 102b and 102c with corresponding user devices 104a, 104b and 104c, respectively, are shown for the sake of simplicity, and it should be noted that many such users can be involved in training of the chatbot.

The environment 100 may be, as an example, an environment wherein a virtual gaming platform (see, 110) is simulated and presented at the user devices 104a, 104b, 104c enabling the users 102a, 102b, 102c to play a game while interacting with the chatbot. Alternatively or additionally, the environment 100 can be any chat/conversation environment where a chatbot dialog interface is presented at the user devices 104a, 104b, 104c for facilitating users (such as the users 102a, 102b, 102c) to converse/interact with the chatbot. The environment 100 includes a server system 108 that manages and hosts the chatbot system. The user device 104a, 104b, 104c and the server system 108 may communicate with each other by means of a communication network 106.

The user devices 104a, 104b, 104c may be any electronic device having hardware components for enabling the platform 110 to be presented at the user devices 104a, 104b, 104c. The user devices 104a, 104b, 104c may be capable of being connected to a wireless communication network (such as the communication network 106). Examples of the user devices 104a, 104b, 104c include gaming systems/gaming consoles of the likes of PlayStation, Xbox, etc., configured with capabilities of providing a chat interface (such as the chatbot system dialog interface). Additional examples of the user devices 104a, 104b, 104c include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

The user devices 104a, 104b, 104c can communicate among themselves or with the server system 108 through the communication network 106. The network 106 may be a centralized network or may comprise a plurality of sub-networks that may offer a direct communication between the entities or may offer indirect communication between the entities. Examples of the network 106 include wireless networks, wired networks, and/or combinations thereof. Some non-exhaustive examples of the wireless networks may include wireless local area networks (WLANs), Bluetooth or Zigbee networks, cellular networks and the like. Some non-exhaustive examples of wired networks may include Local Area Networks (LANs), Ethernet, fiber optic networks and the like. An example of a combination of wired networks and wireless networks may include the Internet.

The server system 108 may be a local server, a remote server or a cloud based server. The server system 108 includes storage devices such as a memory and one or more processors. The memory includes instructions for processing data. The processor executes the instructions stored in the memory and facilitates the chatbot/chatbot system to be used in an environment, such as the environment 100.

The chatbot system may be an application/tool resting at the server system 108. An instance of the application/tool may be installed at the devices 104*a*, 104*b*, 104*c* using application stores associated with any of operating systems including but not limited to Xbox OS, PlayStation system software, Apple iOS™, Android™ OS, Google Chrome OS, Symbian OS®, Windows Mobile® OS, Windows Phone, BlackBerry OS, Embedded Linux, WebOS, Palm OS® or Palm Web OS™, and the like. Alternatively or additionally, the application/tool may be installed at the devices 104*a*, 104*b*, 104*c* by directly accessing the corresponding executable codes from a computer readable media, or it can be installed in form of factory settings. A processor of a device (e.g. the user devices 104*a*, 104*b* and 104*c* or the server system 108) enables a platform/interface for training the chatbot system. In a non-limiting example, the chatbot system may be integrated with web applications for facilitating the users to establish chat session with the chatbot via browsing the web applications. The users 102*a*, 102*b*, 102*c* provide training input through the platform 110.

Some examples of methods and systems used for training of the chatbot are described herein with reference to FIGS. 2 to 8.

Figure 2:
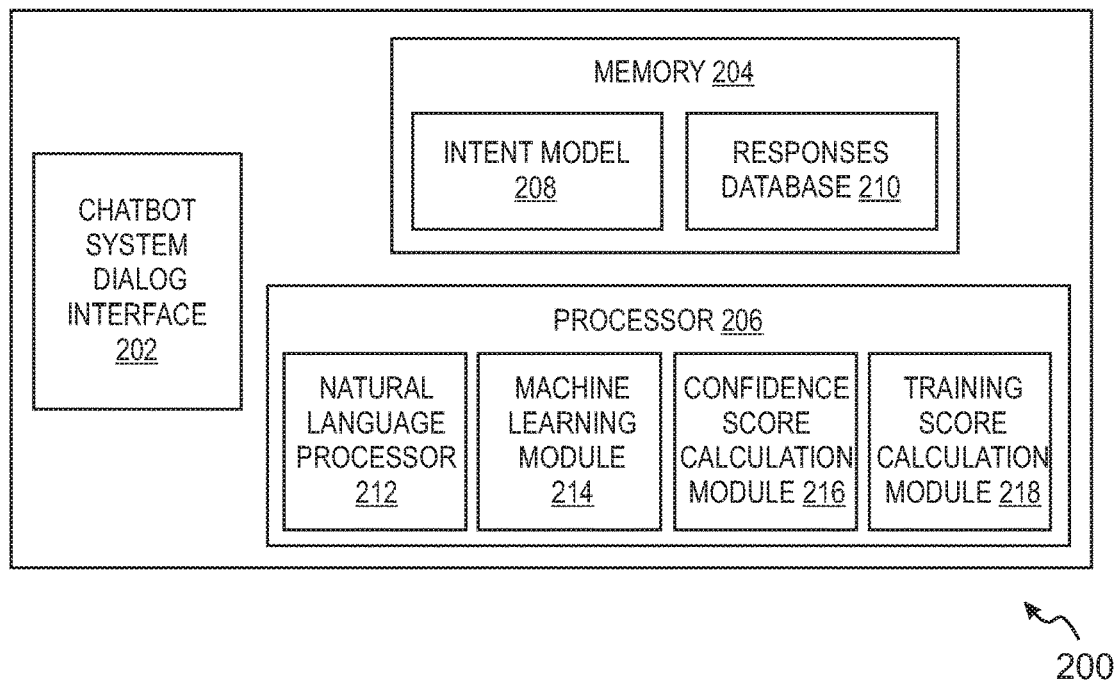
FIG. 2 is a simplified block diagram of a chatbot, in accordance with an example embodiment.

FIG. 2 is a simplified block diagram representation of a chatbot system 200, in accordance with an example embodiment. The chatbot system 200 may be embodied within the server 108 accessible by the user devices 104*a*, 104*b*, 104*c* in a networked environment. Additionally or alternatively, the chatbot system 200 may also be embodied within the user devices 104*a*, 104*b*, 104*c*, where these user devices 104*a*, 104*b*, 104*c* may be connected via a network. In some examples, the chatbot system 200 may be embodied in a personal user device such as any of the user devices 104*a*, 104*b*, 104*c* that may or may not be connected with other user devices.

The chatbot system 200 may include a chatbot system dialog interface 202, a memory 204 and a processor 206. The memory 204 includes one or more databases such as an intent model 208, and a response database 210. Underlying programs/algorithms of the chatbot system 200 can be stored at the memory 204 and that can be executed by the processor 206 for enabling various functionalities of the chatbot system 200.

The interaction between the chatbot system 200 and the user may take place via a chatbot system dialog interface 202. The chatbot system dialog interface 202 receives training inputs from the users involved in training the chatbot system 200. The chatbot system dialog interface 202 may allow the memory 204 to store and process a plurality of training inputs, which may be used to train the chatbot system 200. The training inputs can be provided in form of texts, audio or gestures, or any of their combination. The chatbot system dialog interface 202 is configured using software and firmware codes, and it can be accessed by initiating the platform (see, 110) on any of the user devices such as the devices 104*a*, 104*b*, 104*c*.

The training inputs are also referred to as "inputs" or "input messages" throughout the disclosure. Inputs or input messages within the disclosure refer to text messages, audio messages or audio-video messages (or even gestures) provided by the users (e.g. users 102*a*, 102*b*, 102*c*). The training inputs are stored in the intent model 208. An example of the intent model 208 includes any kind of database such as including but not limited to a relational database. In an embodiment, initially, a plurality of input messages may be preconfigured into the intent model 208. The initial training inputs may be provided by a team of developers of the intent model 208. The training inputs may include words, phrases, questions, answers to questions asked by (or to) the chatbot, requests, and commands to perform an action, among others.

The intent model 208 further stores a plurality of user intents associated with the training inputs. Herein, user intent represents an intent of a user, for example, a question, a greeting, a displeasure or happy state of the user. The intent can be associated with the inputs. For example, a text input "Hi" by the user represents that the user intent is to greet and the user wants to start a conversation. Similarly, text inputs "what", "why" "how" "when", etc., may be associated with a user's query. The intent is generally determined based on parsing the inputs, and accordingly, the intent model 208 stores parsed data corresponding to the training inputs, so that the chatbot system 200 is equipped for interacting with the users. The parsed data may be randomly divided into training and testing data sets for cross-validation.

The memory 204 also includes the response database 210. A plurality of response messages may be preconfigured into the response database 210. Herein, response or response messages refer to text messages, audio messages or audio-video messages provided by the chatbot in response to input messages received from the users. Responses received from the chatbots may include questions and answers to questions posted by the user. The response database 210 may be updated frequently based on training of the chatbot system 200 on a plurality of training inputs and responses. It should be noted that a mapping or a relation is predefined between training inputs, user intents and relevant responses. Further, such mapping or the relation is improved by the training provided by users such as users 102*a*, 102*b*, 102*c*.

The training inputs received from the users may include any of the text inputs, audio inputs or gesture inputs. Audio input may include utterances, such as, sentences indicating a question or answer to a question. Likewise, the responses may be in the form of texts and/or utterances (or gestures). Responses may include words, phrases, sentences indicating a question or answer to a question.

For facilitating training of the chatbot system 200 by the user inputs, the processor 204 includes a natural language processor 212, a machine learning module 214, a confidence score calculation module 216, and a training score calculation module 218. The natural language processor 212 may also include a text to speech engine and a speech to text engine for conversion of speech to text and text to speech, respectively. The processor 204 may be a general-purpose processor, a special purpose processor or graphical unit processor. The processor 204 may be a combination of one or more processing units (CPU).

When a user (such as users 102*a*, 102*b*, 102*c*) provides a training input to the chatbot system 200 using the chatbot dialogue interface 202, the natural language processor 212 is configured to parse the training input received from the user. Based on parsing the training input, one or more data strings are extracted. The one or more data strings are used to interpret the user intent at the intent model 208. Based on the interpretation, a training input may be classified into a relevant user intent taxonomy. The relevant user intent may further be stored within the intent model 208.

In a use case, upon receiving the training input from the user, the chatbot system 200 attempts to identify or predict a user intent of the training input. Based on prediction of the user intent, a response may be provided by the chatbot. If the user intent of the training input provided by the user is correctly and confidently predicted by the chatbot, a high confidence score is calculated for the chatbot system (200) by the confidence score calculation module 216. A high confidence score may be due to a relevant response (as expected in natural human conversation) from the chatbot. Likewise, if the user intent for the training input provided by the user is incorrectly predicted by the chatbot, a low confidence score is calculated for the chatbot system 200 by the confidence score calculation module 216. A low confidence score may result due to an irrelevant response (not as expected in natural human conversation) from the chatbot. Further, based on the confidence score, the chatbot system 200 may provide/deliver training scores (calculated by the training score calculation module 218) to the users who provided the training inputs. In an embodiment, higher the confidence score of the chatbot system 200, lesser is the training score provided to the user; and lesser the confidence score of the chatbot system 200, higher is the training score provided to the user.

The processor 206 may enable the machine learning module 214 to train the chatbot system 200 on high-quality training inputs and responses to present modified and sophisticated responses as expected in a natural human conversation. The machine learning module 214 is a building block that encapsulates a machine learning algorithm, function, or code library that can act on the training inputs (parsed data). By configuring the machine learning module 214, a workflow can be created, which includes reading data (training inputs) from external sources, preparing the data for analysis, parsing data and applying machine learning algorithms.

The confidence score calculation module 216 facilitates calculation of a confidence score (CS) associated with the prediction of the user intent for the training inputs provided by the users. The prediction of the user intent is based on identification and understanding of the training input by the chatbot. The CS is represented as a float number ranged between 0 to 1. The confidence score calculation module 216 includes a set of computer executable instructions/algorithms running at the backend that facilitates calculation of the CS. The algorithms may define one or more criteria and rules to determine how correct or incorrect or how close the prediction of the user intent is in terms of percentage, as an example.

In an embodiment, if the user intent for the training input provided by the user is correctly predicted by the chatbot, the CS is calculated to be high (i.e. CS~1). In other words, if the training input matches one of the plurality of existing training inputs available in the intent model 208 and the user intent is already known to the chatbot or is available in the intent model 208, the calculated CS may be 1 or approximately 1. This means that no new information has been provided to the chatbot. For such a training input, the response provided is relevant and is as expected in a human conversation.

Likewise, if the user intent for the training input provided by the user is incorrectly predicted by the chatbot, the CS is calculated to be low (i.e. CS~0). In other words, if a training input provided by a user is new and does not match any existing training inputs and/or user intents available in the intent model 208, a low CS (i.e. approximately 0) will be calculated, which means the user has trained the chatbot system 200 with new information. For such a training input, a pre-configured response (see 502d in FIG. 5) may be generated. Alternatively or additionally, a response which is irrelevant to a context of the training input may be provided. Such a response is not as expected in a human conversation.

Further, the CS can be between low and high (i.e. between 0 and 1). In an embodiment, if the training input is new but the user intent of the training input is identified and correctly predicted by the chatbot based on intelligence and machine learning or availability of the user intent in the intent model 208, the CS may be calculated as a value between 0 and 1. For instance, the user may provide a training input which the chatbot system 200 may not know, but based on information available in the intent model 208, a user intent is correctly predicted. This means that the user has trained the chatbot system 200 with partially new information. For such a training input, the response provided may or may not be as expected in a human conversation.

The training score calculation module 218 may facilitate calculation of the training score (TS) for the user based on the training inputs provided by the user. The training score calculation module 218 may use data from the confidence score calculation module 216 for calculating the TS. The training score calculation module 218 delivers a high TS (i.e. 1) if the CS is low (i.e. 0). Further, the training score calculation module 218 delivers a low TS (i.e. 0) if the CS is low (i.e. 1). A high TS is obtained by the user if the user trains the chatbot with new training inputs for which the user intent is predicted incorrectly and the response provided is not as expected in a human conversation.

In an embodiment, the TS can be calculated based on the formula, TS=1−CS. In an example, if the CS calculated by the confidence score calculation module 216 is 1, then the TS for the training input will be 1−1 i.e. 0. Similarly, if the CS is calculated to be 0.78 for a training input, the TS will be 1−0.78=0.22.

The chatbot system 200 may display the TS calculated by the training score calculation module 218 at the user devices (such as user devices 104a, 104b, 104c). The TS may be used to determine ranks of the users (such as users 102a, 102b and 102c) among a plurality of users involved in training the chatbot system 200. The TS may also be used to determine a cumulative training score (CTS) for the users. The CTS for a user (e.g. user 102a) is the summation of all TS obtained by the user for a pre-defined duration (say a week, a month) based on the training inputs provided by the user. Further, the CTS of a user indicates how big an impact the user has made to train the chatbot system 200 and to improve the intent model 208. The rank of the user along with the CTS may be displayed on a leaderboard (shown in FIGS. 6A and 6B).

Figure 3:
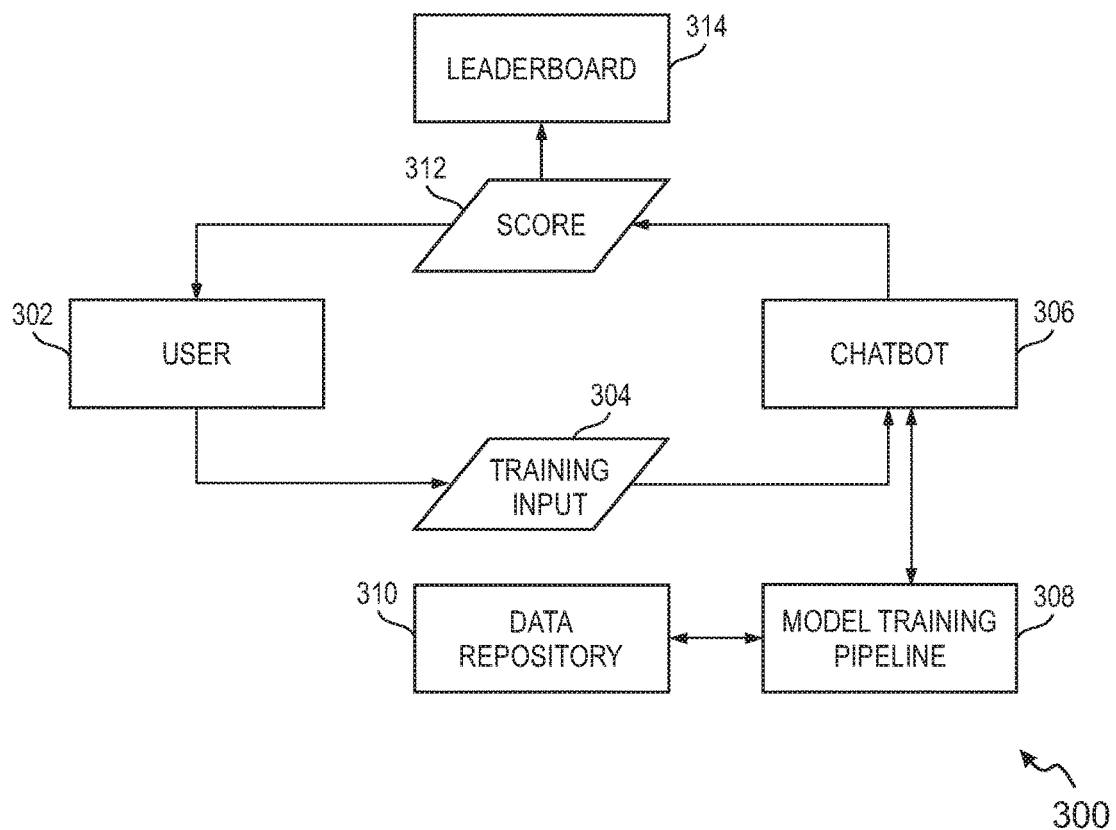
FIG. 3 is a simplified flow diagram for training of the chatbot, in accordance with an example embodiment.

FIG. 3 is a simplified flow diagram 300 for training a chatbot 306, in accordance with an example embodiment. The chatbot 306 is an example of the chatbot system/chatbot 200. A user 302 may provide a training input 304 to the chatbot 306 for training the chatbot 306 using the chatbot system dialog interface 202 (not shown in FIG. 3). The user 302 may be one of the plurality of users 102a, 102b, 102c shown in FIG. 1. The training input 304 may be in the form of texts and/or audio.

The training input 304 provided by the user 302 may be stored in a data repository 310. The data repository 310 may be an example of the intent model 208. The training input 304 may be transferred from the data repository 310 to a model training pipeline 308. The model training pipeline 308 may attempt to find whether the user intent of the training input 304 provided by the user 302 is available in the intent model 208 or not. In an embodiment, if the user intent of the training input 304 is not available in the intent model 208, the model training pipeline 308 may update the intent model 208 with the training input 304 provided by the user 302. The TS and the CS for the training input 304 may be calculated as described with reference to FIG. 2.

The chatbot 306 may provide a score 312 to the user 302 for the training input 304 provided by the user 302. The score 312 is the TS calculated based on the CS, where the CS is calculated based on prediction of the user intent of the training input 304. The score 312 given to the user 302 by the chatbot 306 may be displayed on the chatbot system dialog interface 202 at the user device. The score 312 may also be provided to a leaderboard 314.

The leaderboard 314 may display the scores of a plurality of users involved in training of the chatbot 306. In a non-limiting example, the leaderboard 314 may display two types of CTS and two types of average scores (AS) for the plurality of users. The two types of CTS may include an all-time training score and a daily training score (shown in FIG. 6A). The two types of AS may include an all-time average training score and a daily average training score for the day (shown in FIG. 6B). As an example, the leaderboard 314 may display the CTS and AS in the decreasing order of the rank of users i.e. a user with the highest score will be on the top and the user with the lower score will be at the bottom of the leaderboard 314.

Figure 4:
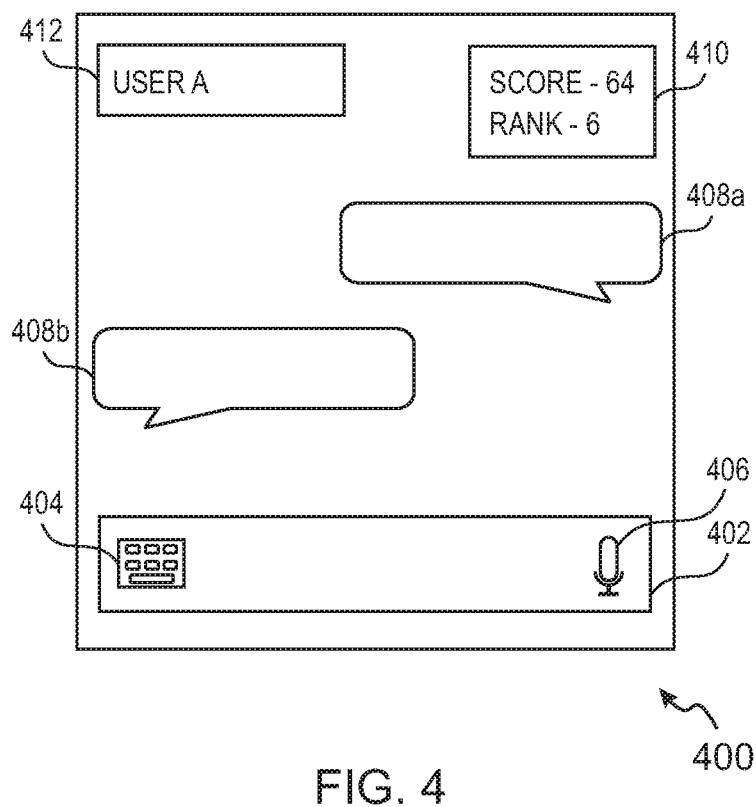
FIG. 4 is a simplified representation of a training interface for training the chatbot, in accordance with an example embodiment.

FIG. 4 is a simplified representation of a training interface 400 for training a chatbot (such as the chatbot system 200 or the chatbot 306) presented at a user device (e.g. 104a, 104b, 104c), in accordance with an example embodiment. The training interface 400 may be used as a gaming interface in environments such as environment 100 shown in FIG. 1 where the users 102a, 102b, 102c can play a game.

The training interface 400 can be accessed by initiating the platform (see, 110) on any of the user devices such as the devices 104a, 104b, 104c. The training interface 400 facilitates a field 402 where a user (such as the users 102a, 102b, 102c) can provide training inputs in form of texts at the field 402. The field 402 includes an actionable icon 404. The selection (e.g., by clicking, pressing or tapping) of the actionable icon 404 facilitates a virtual keypad/keyboard as an overlay interface on the training interface 400. Further, the field 402 includes an actionable icon 406. Selection of the actionable icon 406 activates a microphone, thereby activating a voice input sensor of training interface 400 responsible for receiving voice input. After selection of the actionable icon 406, the voice input sensor remains active for a predefined duration within which the voice input sensor can receive utterances from the user (e.g. user 102a).

The training interface 400 includes message boxes exemplarily shown as boxes 408a and 408b. The message box 408a represents training inputs provided by the users. The message box 408b represent response messages received from the chatbot through the training interface 400. In an embodiment, the user may provide one or more training inputs consecutively. Also, the chatbot may post one or more response messages consecutively.

The training interface 400 includes a score board 410 where the TS obtained by a user (e.g. user 102a) for providing training inputs is displayed (see, "score-64"). The score board 410 may also display (see, "rank-6") the rank scored by the user. The rank may be determined by considering the TS and CTS of a plurality of users (such as user 102a, 102b, 102c shown in FIG. 1) involved in training the chatbot. The training interface 400 further includes a profile section 412 where information related to the user (e.g. user 102a) is displayed. The information may include name and a profile photo of the user.

Figure 5:
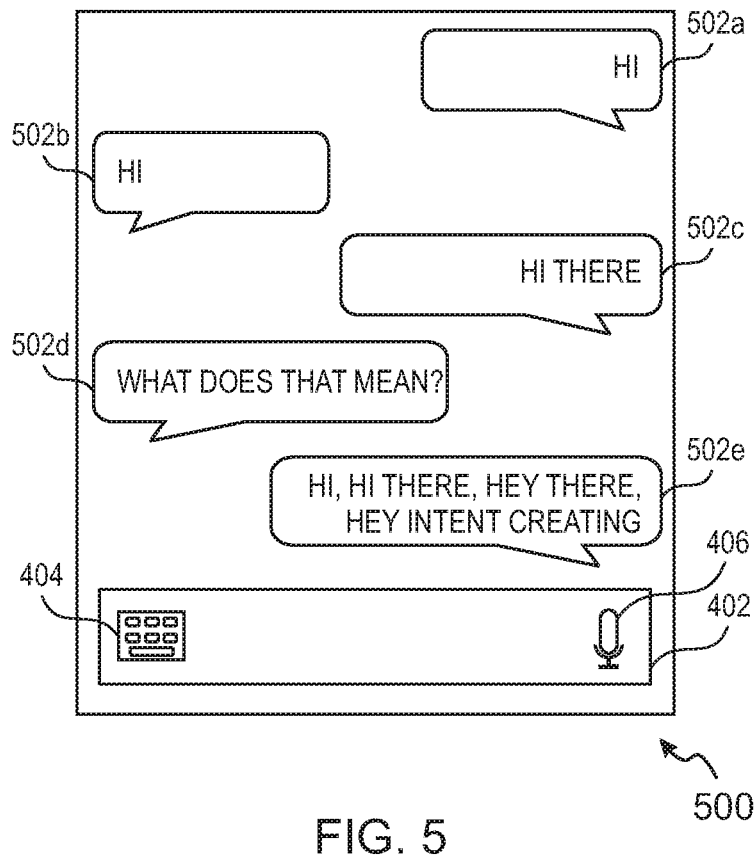
FIG. 5 is another simplified representation of a training interface for training the chatbot, in accordance with an example embodiment.

FIG. 5 is another example representation of a training interface 500 for training a chatbot (such as the chatbot system 200 or the chatbot 306), in accordance with an example embodiment. The training interface 500 can be accessed by initiating the platform (see, 110) on any of the user devices such as the devices 104a, 104b, 104c. A user (e.g. user 102a) may attempt to train the chatbot using the training interface 500. The training interface 500 includes message boxes exemplarily shown as boxes 502a, 502b, 502c, 502d and 502e. The message boxes 502a, 502c and 502e show training inputs provided by the user. The message boxes 502b and 502d show response messages received from the chatbot in response to the training inputs provided by the user on the training interface 500.

The conversation between the user and the chatbot starts with the user providing an input (training input) "Hi" depicted by the message box 502a, to which the chatbot replies with a "Hi" as depicted by the message box 502b. The chatbot predicts the user intent of the input "Hi" depicted by the message box 502a with maximum accuracy. This indicates that the user intent of the input "Hi" provided by the user is already available in the intent model 208. Hence, the CS calculated for the input of the message box 502a may be 1. As a result, the TS obtained by the user may be 0. Further, the user attempts to trick the chatbot by providing another training input "Hi there" depicted by the message box 502c. In response, the chatbot replies with a pre-defined response (text/utterance) "What does that mean?" depicted by the message box 502d. The pre-configured message included within the message box 502d may help the user in determining whether some training scope is present. It shall be noted that the pre-defined response shown in FIG. 5 is exemplary and can include several variations, such as, "Sorry, I didn't get you", Sorry, can you rephrase the question", etc. In alternate embodiment, the pre-defined response may be replaced by random responses not expected in a natural human conversation which determines that there is a scope of training the chatbot. Since, the chatbot has not understood the user's intent as provided in the message box 502c, the CS of the chatbot is accordingly calculated i.e 0.1.

In response to the pre-defined response message depicted by message box 502d, the user may attempt to teach/train the chatbot the meaning and user intent of the input "Hi there". The user responds by providing a reply 'Hi, Hi there, Hey there, Hey' intent: Greeting" depicted by the message box 502e. The user trains the chatbot with the training inputs as shown in the message box 502e. The input shown in the message box 502e represents that user teaches the chatbot the intent of the training input in message box 502c. The intent model 208 and the response database 210 may be updated based on the training input provided in the message box 502e. Since, the user has trained the chatbot as shown in the message box 502e, the TS of the user is accordingly calculated (e.g., 0.8) based on the CS, and is assigned to the user.

FIG. 6A is a representation of a leaderboard 600 (such as the leaderboard 314) for displaying the TS and CTS of the plurality of users involved in training of the chatbot, in accordance with an example embodiment. The leaderboard may display two types of CTS for a plurality of users, such as user 102a, 102b 102c shown in FIG. 1. The two types of CTS may include an all-time training score and a daily training score for the plurality of users. The leaderboard may display the CTS in the decreasing order i.e. the user with the higher score will be on the top (e.g., John Smith for all time) and the user with the lower score (e.g., Larry Brown for all time) will be at the bottom. The all-time training score and the daily training score of the user may be displayed with a profile picture and a user name of the user.

FIG. 6B is a representation 602 of a leaderboard for displaying average training scores of the plurality of users involved in training of the chatbot, in accordance with an example embodiment. The leaderboard 602 may display two types of the average training scores for the plurality of users.

The two types of average training scores may include all-time average training score and a daily average training score. The leaderboard may display the average training scores in the decreasing order i.e. the user with the higher score ( ) will be on the top and the user with the lower score ( ) will be at the bottom.

In an embodiment, the all-time training score of a user (such as user 102*a*) may be the sum of all the TS till date provided to the user in response to all training inputs provided by the user to train the chatbot. The daily training score of the user may be the sum of all the TS provided to the user in response to all training inputs provided by the user to train the chatbot on the current date. In an embodiment, the all-time average training score of the user may be the average of all the TS till date provided to the user in response to all training inputs provided by the user to train the chatbot. The daily average training score of the user may be the average of all the TS provided to the user in response to all training inputs provided by the user to train the chatbot on the current date.

Figure 7:
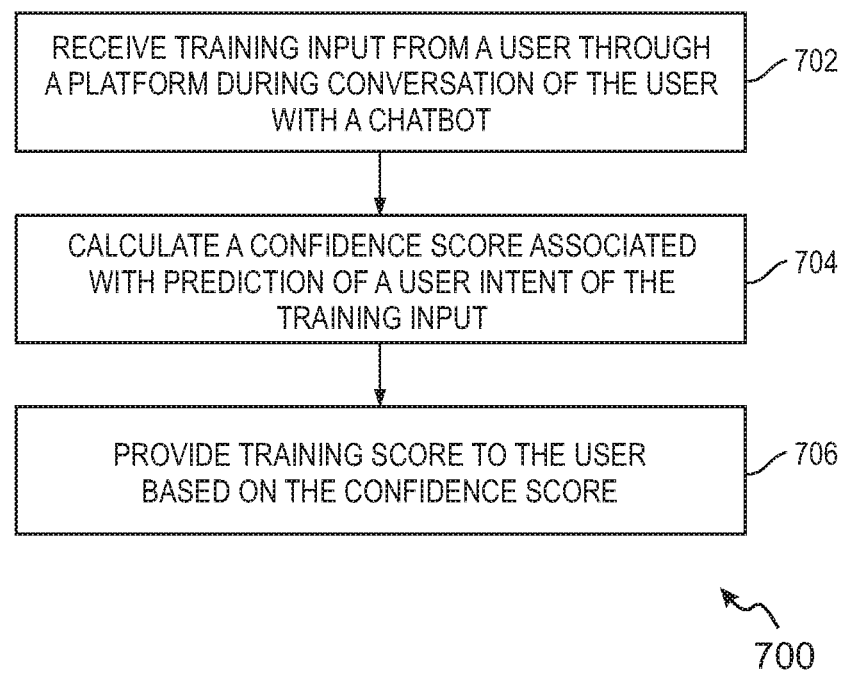
FIG. 7 is a flowchart illustrating a method of training the chatbot, in accordance with an example embodiment.

FIG. 7 is a flowchart illustrating a method 700 for training a chatbot, in accordance with an example embodiment. The method 700 includes a sequence of operations. The operations of method 700 is carried out by the chatbot system 200/chatbot 306. The sequence of operations of the method 700 may not be necessarily executed in the same order as they are presented. Further, one or more operations may be grouped together and performed in form of a single step, or one operation may have several sub-steps that may be performed in parallel or in sequential manner.

At operation 702, the chatbot receives a training input from a user through a platform (e.g. chatbot system dialog interface 202) during a conversation of the user with the chatbot. The training input indicates the user intent for interacting with the chatbot. The training input can be in the form of audio or texts.

At operation 704, the chatbot calculate the CS associated with prediction of the user intent. The CS is calculated based on understanding of the user intent of the training input by the chatbot. The CS is represented in a float number ranged between 0 to 1.

If the user intent for the training input provided by the user is correctly predicted by the chatbot, a high CS (i.e. 1) is calculated for the chatbot. In other words, if the training input matches one of the plurality of existing training inputs available in the intent model 208 and the user intent is already known to the chatbot or is available in the intent model 208, the calculated CS may be 1 or approximately 1. This means that no new information has been provided to the chatbot. For such a training input, the response provided is relevant and is as expected in a human conversation.

Likewise, if the user intent for the training input provided by the user is incorrectly predicted by the chatbot, a low CS is calculated Similarly, the CS can be between low and high (i.e. between 0 and 1). In other words, if a training input provided by a user is new and does not match any existing training inputs and/or user intents available in the intent model 208, a low CS (i.e. approximately 0) will be calculated, which means the user has trained the chatbot system 200 with new information. For such a training input, a pre-configured response (see 502*d*) may be generated. Alternatively, or additionally, a response which is irrelevant to a context of the training input may be provided. Such a response is not as expected in a human conversation. Further, the CS can be between low and high (i.e. between 0 and 1).

At operation 706, the TS is provided to the user based on the CS. The training score calculation module 218 delivers a high TS (i.e. 1) if the CS is low (i.e. 0). Further, the training score calculation module 218 delivers a low TS (i.e. 0) if the CS is high (i.e. 1). A high TS is obtained by the user if the user trains the chatbot with new training inputs for which the user intent is predicted incorrectly and the response provided is not as expected in a human conversation. The TS can be calculated based on the formula, $TS=1-CS$.

Figure 8:
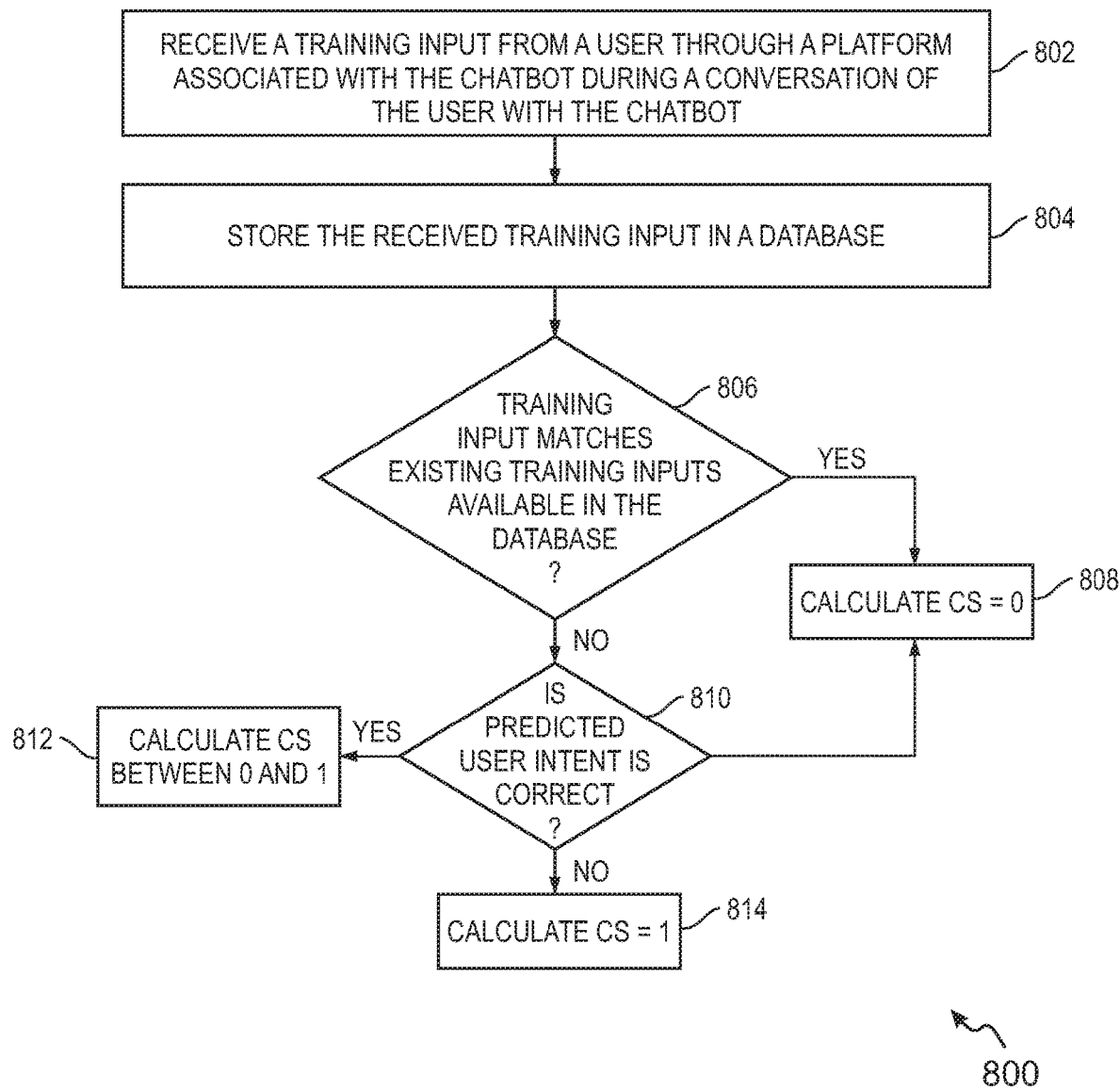
FIG. 8 is a flowchart illustrating a method of determining a training score, in accordance with an example embodiment.

FIG. 8 is a flowchart illustrating a method 800 for determining training score, in accordance with an example embodiment. The method 800 includes a sequence of operations. The operations of method 800 may be carried out by the chatbot system 200/chatbot 306. The sequence of operations of the method 800 may not be necessarily executed in the same order as they are presented. Further, one or more operations may be grouped together and performed in form of a single step, or one operation may have several sub-steps that may be performed in parallel or in sequential manner.

At operation 802, the chatbot receives a training input from a user through a platform (chatbot dialog interface 202) associated with the chatbot during a conversation of the user with the chatbot. The training input indicates the user intent for interacting with the chatbot. The training input can be in the form of audio or texts. At operation 804, the received training input is stored in a database, where database comprises a plurality of existing training inputs. The training input(s) may be parsed to determine the user intent. The parsed data is stored in the database so that the chatbot is ready for interacting with the users. Example of the database can include the intent model 208.

At operation 806, the chatbot determines whether the training input received through the platform matches with one of the plurality of training inputs available in the database. If it is determined that the training input received through the platform matches one of the plurality of existing training inputs in the database, then at operation 808, a $CS=0$ is calculated.

Further, if it is determined that the training input received through the platform does not match any existing training inputs in the database, then at operation 810, it is determined if a user intent predicted by the chatbot for the training input is correct. If it is determined that the user intent predicted by the chatbot for the training input is correct, then, at operation 812, a CS between 0 and 1 is calculated. The CS is calculated based on pre-defined rules and criteria defined in the underlying algorithm of the chatbot. The CS may be calculated in terms of percentage, such as 100% confident/correct/accurate, 0% confident, 68% confident, 73% confident, 24% confident, as an example. Based on percentage, the CS may be normalized to 1, 0, 0.68, 0.73, 0.24.

Further, if it is determined that the user intent predicted by the chatbot for the training input is incorrect, then, at operation 814, a $CS=1$ is calculated. The chatbot calculates the training score based on the CS. In a non-limiting example, the training score calculation is based on the formula, $TS=1-CS$. In an example embodiment, if the CS is 1, then the TS will be $1-1$ i.e. 0.

Figure 9:
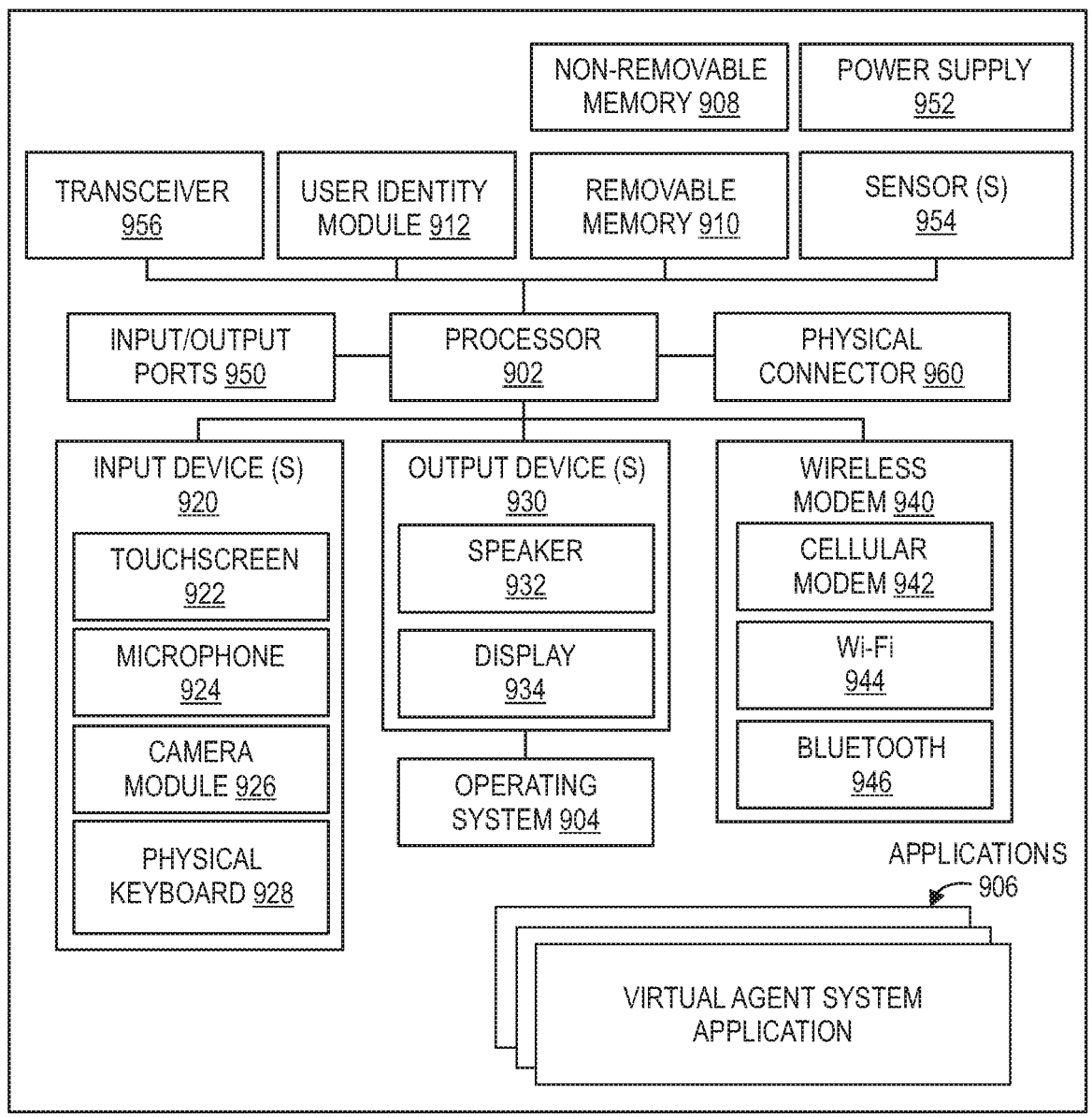
FIG. 9 is a block diagram of a user device, in accordance with one example embodiment.

FIG. 9 shows a simplified block diagram of a user device capable of implementing the various embodiments of the present disclosure. The user device 900 may be an example any of the user devices 104*a*, 104*b*, 104*c*. In an embodiment, the various operations related to conducting a conversation with the chatbot can be facilitated using a chatbot application 906 (standalone application) installed in the mobile phone 900.

It should be understood that the user device 900 as illustrated and hereinafter described is merely illustrative of one type of device and should not be taken to limit the scope of the embodiments. As such, it should be appreciated that at least some of the components described below in connection with that the user device 900 may be optional and thus in an example embodiment may include more, less or different components than those described in connection with the example embodiment of the FIG. 9. As such, among other examples, the user device 900 could be any of a mobile electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 control the allocation and usage of the components of the user device 900 and support for one or more applications programs (see, virtual agent system application 906). The virtual agent system application 906 may include common mobile computing applications (e.g., web browsers, messaging applications) or any other computing application.

The illustrated user device 900 includes one or more memory components, for example, a non-removable memory 908 and/or removable memory 910. The non-removable memory 908 and/or removable memory 910 may be collectively known as database in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the virtual agent system application 906. The user device 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to a speaker 932 and a display 934. Other possible output devices can include piezoelectric or other haptic output devices. Some devices can serve more than one input/output function. For example, the touch screen 922 and the display 934 can be combined into a single input/output device.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the user device 900 and a public switched telephone network (PSTN).

The user device 900 can further include one or more input/output ports 950, a power supply 952, one or more sensors 954 for example, an accelerometer, a gyroscope, a compass, or an infrared proximity sensor for detecting the orientation or motion of the mobile phone 900, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

The disclosed methods with reference to FIGS. 1 to 8, or one or more operations of the flow diagram 700 and 800 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 10:
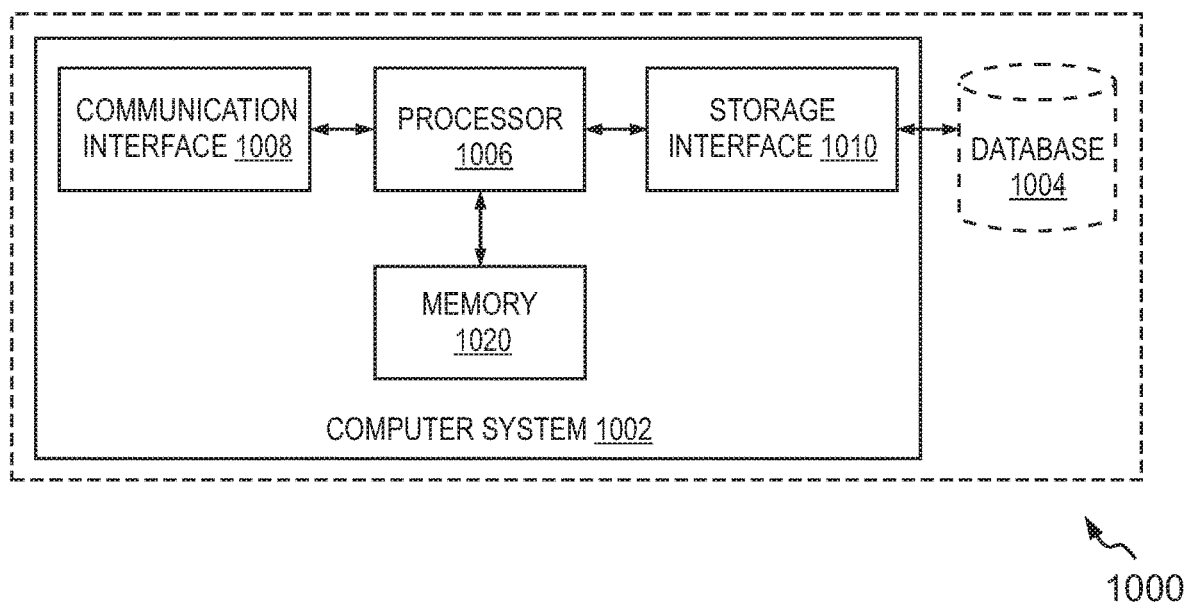
FIG. 10 is a simplified block diagram of a server, in accordance with one example embodiment.

FIG. 10 is a simplified block diagram of a server system 1000, in which the chatbot 306 may be stored, in accordance with one embodiment of the present disclosure. The server system 1000 includes a computer system 1002 and one or more databases, such as a database 1004.

The computer system 1002 includes a processor 1006 for executing instructions. The processor 1006 may be an example of the processor 1004. Instructions may be stored in, for example, but not limited to, a memory 1008 (example of memory 204). The processor 1006 may include one or more processing units (e.g., in a multi-core configuration). The processor 1006 is operatively coupled to a communication interface 1008 such that computer system 1002 can communicate with the user device 302.

The processor 1006 may also be operatively coupled to the database 904. The database 1004 is any computer-operated hardware suitable for storing and/or retrieving data. The database 1004 may include multiple storage units such as hard disks and/or solid-state disks in a redundant array of inexpensive disks (RAID) configuration. The database 1004 may include, but not limited to, a storage area network (SAN) and/or a network attached storage (NAS) system.

In some embodiments, the database 1004 is integrated within computer system 1002. For example, computer system 1002 may include one or more hard disk drives as database 1004. In other embodiments, database 1004 is external to computer system 1002 and may be accessed by the computer system 1002 using a storage interface 1010. The storage interface 1010 is any component capable of providing the processor 1006 with access to the database 1004. The storage interface 1010 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1006 with access to the database 1004.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application\or implementation without departing from the spirit or scope of the claims.

What is claimed is:

1. A computer-implemented method for training a chatbot, the method comprising:
    receiving, by a processor, a training input from a user through a platform associated with the chatbot, the training input indicative of a user intent for interacting with the chatbot;
    calculating, by the processor, a confidence score associated with a prediction of the user intent identified by the chatbot; and
    providing, by the processor, a training score to the user providing the training input based on the confidence score.

2. The method as claimed in claim 1, further comprising storing the training input in a database, the database comprising a plurality of existing training inputs.

3. The method as claimed in claim 2, wherein calculating the confidence score further comprises determining a high confidence score associated with the prediction of the user intent when the training input received through the platform matches one of the plurality of existing training inputs in the database.

4. The method as claimed in claim 2, wherein calculating the confidence score further comprises determining a low confidence score associated with the prediction of the user intent when the training input received through the platform is a new training input and is not present in the database.

5. The method as claimed in claim 1, wherein providing the training score further comprises providing a high training score, if the confidence score associated with prediction of the user intent for the training input is a low score.

6. The method as claimed in claim 1, wherein providing the training score further comprises providing a low training score, if the confidence score associated with prediction of the user intent for the training input is a high score.

7. The method as claimed in claim 1, wherein providing the training score further comprises calculating a cumulative training score for all training inputs provided by the user through the platform for a pre-defined duration.

8. The method as claimed in claim 7, wherein providing the training score further comprises displaying a leaderboard at a user device associated with the user, the leaderboard comprising at least a daily training score, the cumulative training score, an average training score and a rank of the user at least based on the cumulative training score.

9. The method as claimed in claim 1, further comprising providing the user an option, in the platform, to train the chatbot if the confidence score associated with a prediction of the user intent detected by the chatbot is determined to be low.

10. The method as claimed in claim 1, wherein the training input is at least one of a text input and an audio input.

11. A system for training a chatbot, the system comprising:
a memory configured to store instructions; and
a processor configured to execute the instructions stored in the memory to cause the system to perform:
receiving a training input through a platform associated with the chatbot, the training input indicative of a user intent for interacting with the chatbot;
calculating a confidence score associated with a prediction of the user intent identified by the chatbot, wherein to calculate the confidence score, the system is further caused to:
calculate a high confidence score associated with the prediction of the user intent when the training input received through the platform matches one of a plurality of existing training inputs in a database; and
providing a training score to a user providing the training input based on the confidence score.

12. The system as claimed in claim 11, further comprising the database configured to store the training input, the database comprising the plurality of existing training inputs.

13. The system as claimed in claim 11, wherein the system is further caused to calculate a low confidence score associated with the prediction of the user intent when the training input received through the platform is a new training input and is not present in the database.

14. The system as claimed in claim 11, wherein the system is further caused to provide a high training score, if the confidence score associated with prediction of the user intent for the training input is a low score.

15. The system as claimed in claim 11, wherein, to deliver the training score, the system is further caused to calculate a cumulative training score for all training inputs provided by the user through the platform for a pre-defined duration.

16. The system as claimed in claim 15, wherein, to deliver the training score, the system is further caused to display a leaderboard at a user device associated with the user, the leaderboard comprising at least a daily training score, the cumulative training score, an average training score and a rank of the user at least based on the cumulative training score.

17. A gaming system comprising:
an intent model for storing a plurality of user inputs and corresponding intents;
a dialogue interface for receiving a training input from a user, the training input indicative of a user intent for interacting with a chatbot;
a memory configured to store instructions; and
a processor configured to execute the instructions stored in the memory to cause the gaming system to perform at least:
calculating a confidence score associated with a prediction of the user intent identified by the chatbot, and
delivering a training score to the user providing the training input based on the confidence score.

18. The gaming system as claimed in claim 17, wherein the intent model is configured to store the training input, if the training input is not present in the intent model.

19. The gaming system as claimed in claim 17, wherein the gaming system is further caused to calculate the confidence score which is inversely proportional to the training score.

* * * * *